United States Patent
Zhou et al.

(10) Patent No.: US 12,431,969 B2
(45) Date of Patent: Sep. 30, 2025

(54) APR PROTECTION METHOD AND DEVICE, AND COMPUTER STORAGE MEDIUM

(71) Applicant: ACCELINK TECHNOLOGIES CO., LTD., Wuhan (CN)

(72) Inventors: Qi Zhou, Wuhan (CN); Zhaoxia Liu, Wuhan (CN); Ying Zhang, Wuhan (CN); Tao Yuan, Wuhan (CN); Jiekui Yu, Wuhan (CN); Chuanbin Zhang, Wuhan (CN); Zhengwei Peng, Wuhan (CN); Feifei He, Wuhan (CN)

(*) Notice: Subject to any disclaimer, the term of this patent is extended or adjusted under 35 U.S.C. 154(b) by 320 days.

(21) Appl. No.: 17/801,590

(22) PCT Filed: Dec. 28, 2020

(86) PCT No.: PCT/CN2020/139858
§ 371 (c)(1),
(2) Date: Aug. 23, 2022

(87) PCT Pub. No.: WO2021/190021
PCT Pub. Date: Sep. 30, 2021

(65) Prior Publication Data
US 2023/0091366 A1    Mar. 23, 2023

(30) Foreign Application Priority Data
Mar. 23, 2020  (CN) .......................... 202010209910.6

(51) Int. Cl.
*H04B 10/032*  (2013.01)
*H04B 10/079*  (2013.01)

(52) U.S. Cl.
CPC ..... *H04B 10/032* (2013.01); *H04B 10/07955* (2013.01)

(58) Field of Classification Search
CPC ............ H04B 10/0771; H04B 2210/08; H04B 10/0775; H04B 10/0779; H04B 10/077;
(Continued)

(56) References Cited

U.S. PATENT DOCUMENTS 10,063,313 B1 *  8/2018  Al Sayeed ............ H04J 14/029
2004/0047628 A1 *  3/2004  Passier ................. H04J 14/0221
                                                                    398/20
(Continued)

FOREIGN PATENT DOCUMENTS

CN          1852057 A      10/2006
CN        101882958 A      11/2010
(Continued)

OTHER PUBLICATIONS

International Search Report of PCT/CN2020/139858 filed Dec. 28, 2020.
(Continued)

*Primary Examiner* — Hibret A Woldekidan
(74) *Attorney, Agent, or Firm* — Chang & Hale LLP

(57) ABSTRACT

Disclosed are an APR protection method and device, and a computer storage medium. A preamplifier PA of each of two optical amplifier units at two ends of a transmission line is connected to a booster amplifier BA of the other amplifier unit by an optical fiber. The method comprises: when a reception state of PA of at least one of two amplifier units is a loss of signal state and a switch chip of said amplifier unit detects a link interruption signal, activating an APR protection state of said amplifier unit which is to turn off BA output of said amplifier unit; when the switch chip of at least one of two amplifier units detects a link conduction signal, deactivating the APR protection state of the present amplifier unit to restore a state of BA of said amplifier unit to a state before the APR protection state is activated.

18 Claims, 3 Drawing Sheets

Optical amplifier unit A   Optical amplifier unit B   Optical amplifier unit C

(58) Field of Classification Search
CPC ............... H04B 10/075; H04B 10/073; H04B 10/0731; H04B 10/03; H04B 10/032; H04B 10/038; H04B 10/0777; H04B 10/07955; H04B 10/0797; H04B 10/0791; H04B 10/0793
See application file for complete search history.

(56) References Cited

U.S. PATENT DOCUMENTS

| | | | |
|---|---|---|---|
| 2011/0008051 A1* | 1/2011 | Miyaji | H04J 14/0275 398/79 |
| 2012/0248287 A1 | 10/2012 | Shukunami | |
| 2018/0278361 A1* | 9/2018 | Nakata | H04B 10/07955 |
| 2019/0109638 A1 | 4/2019 | Yilmaz et al. | |
| 2020/0313766 A1 | 10/2020 | Chedore | |

FOREIGN PATENT DOCUMENTS

| | | | | |
|---|---|---|---|---|
| CN | 109327262 A | * | 2/2019 | ......... H04B 10/2931 |
| CN | 112106312 A | | 12/2020 | |
| IN | 101453266 A | | 6/2009 | |

OTHER PUBLICATIONS

Written Opinion of the International Searching Authority of PCT/CN2020/139858 filed Dec. 28, 2020.
Search Report of Chinese Priority Application CN202010209910.6 filed Mar. 23, 2020.

\* cited by examiner in a case where a reception state of the PA of at least one of the two optical amplifier units is a loss of signal LOS state, and a switch chip of the present optical amplifier unit detects a link interruption signal, activating an APR protection state of the present optical amplifier unit, wherein the APR protection state is to turn off output of the BA of the present optical amplifier unit.    101 in a case where a switch chip of at least one of the two optical amplifier units detects a link conduction signal, deactivating the APR protection state of the present optical amplifier unit, so as to make a state of the BA of the present optical amplifier unit be restored to a state before the APR protection state is activated.    102

FIG. 1

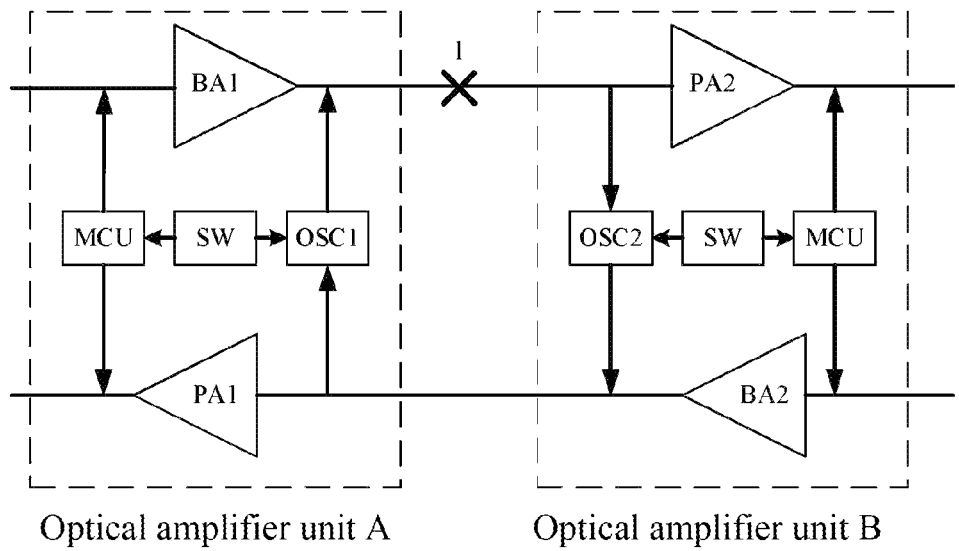

Optical amplifier unit A      Optical amplifier unit B

FIG. 2

APR PROTECTION METHOD AND DEVICE, AND COMPUTER STORAGE MEDIUM

CROSS-REFERENCE TO RELATED APPLICATION

The present disclosure claims the priority of a Chinese patent application No. 202010209910.6, filed on Mar. 23, 2020, the disclosure of which is hereby incorporated by reference herein in its entirety.

TECHNICAL FIELD OF THE DISCLOSURE

The present disclosure relates to the technical field of optical communication, and in particular, to an APR protection method, a device, and a computer storage medium.

BACKGROUND

In the optical communication system, the upper limit of the optical power in the optical fiber communication line will cause harm to human eyes. If the optical power in the system is very large, once the optical fiber is accidentally broken or the connector is pulled out, the leaked light will directly hurt the human eyes, which will generate a great danger. Therefore, an automatic optical power reduction (APR) mechanism is required to be activated to reduce the optical power in the optical fiber line to a safe range, so as to play the role of eye protection.

Most of the conventional APR function implementation solutions use the optical amplifier (OA) unit to detect optical power and send activation pulses as an activation method of the APR function. However, the activation method has the following defects:

1) If the user accidentally closes the output of the pump laser in the OA unit, the APR function can be directly triggered, thereby causing misexcitation.
2) For a multi-stage OA unit system, if the APR function of a certain stage OA unit is activated, since the OA unit has the characteristic of amplifying the received light and then sending the same, the activation pulse received by the current stage OA unit will be transmitted to each stage of OA unit downstream, thereby activating the APR function of each stage of OA unit downstream, and generating a linkage reaction, which causes many inconvenience to the state management of the whole system.

Therefore, it is an urgent problem to be solved in the present technical field to overcome the above-mentioned defects in the prior art.

SUMMARY

On that account, embodiments of the present disclosure provide an APR protection method and device, and a computer storage medium to solve at least one problem existing in the prior art.

In order to realize the above-mentioned purpose, the technical solutions of the embodiments of the present disclosure are implemented as follows.

In a first aspect, the embodiments of the present disclosure provide an automatic optical power reduction APR protection method. For two optical amplifier units at both ends of a transmission line, a pre-Amplifier PA of each of the two optical amplifier units is connected to a booster amplifier BA of the other optical amplifier unit by means of an optical fiber, and the method comprises:

in a case where a reception state of the PA of at least one of the two optical amplifier units is a loss of signal LOS state, and a switch chip of the present optical amplifier unit detects a link interruption signal, activating an APR protection state of the present optical amplifier unit, wherein the APR protection state is to turn off output of the BA of the present optical amplifier unit;

in a case where the switch chip of at least one of the two optical amplifier units detects a link conduction signal, deactivating the APR protection state of the present optical amplifier unit, so as to make a state of the BA of the present optical amplifier unit be restored to a state before the APR protection state is activated.

In an optional embodiment, N relay optical amplifier units are further provided between the two optical amplifier units, where N is a positive integer;

in a case where a reception state of a first optical line amplifier (LA) of at least one of the N relay optical amplifier units is the LOS state, and a switch chip of the present relay optical amplifier unit detects the link interruption signal, activating a APR protection state of the present relay optical amplifier unit, wherein the APR protection state is to turn off a second LA output of the present relay optical amplifier unit;

in a case where a switch chip of at least one of the N relay optical amplifier units detects a link conduction signal, deactivating the APR protection state of the present relay optical amplifier unit, so as to make a state of the second LA of the present relay optical amplifier unit be restored to a state before the APR protection state is activated.

In an optional embodiment, after the activation of the APR protection state of the present optical amplifier unit, the method further comprises:

triggering the BA of the present optical amplifier unit to send an encoded pulse signal with a lasting time of a first duration to the PA of the other optical amplifier unit according to a preset period; in a case where the PA of at least one of the two optical amplifier units detects the encoded pulse signal, marking the reception state of the PA of the present optical amplifier unit as a non-LOS state; in a case where a light state of the PA of at least one of the two optical amplifier units lasts for a second duration, deactivating the APR protection state of the present optical amplifier unit; and/or, in a case where the first LA of at least one of the N relay optical amplifier units detects the encoded pulse signal, marking the reception state of the second LA of the present relay optical amplifier unit as the non-LOS state; in a case where a light state of the first LA of at least one of the N relay optical amplifier units lasts for the second duration, deactivating the APR protection state of the present relay optical amplifier unit;

wherein the second duration is twice the first duration.

In an optional embodiment, the method further comprises:

in a case where the reception state of the PA of at least one of the two optical amplifier units is the non-LOS state, triggering the BA of the present optical amplifier unit to reduce output power to be below preset power; and/or, in a case where the reception state of the first LA of at least one of the N relay optical amplifier units is the non-LOS state, triggering the second LA of the present relay optical amplifier unit to reduce output power to be below preset power; and in a case where the reception state of the PA of at least one of the two optical amplifier units is the LOS state, triggering the BA of the present optical amplifier unit to control a pump laser according to the preset period of the sent encoded pulse signal; and/or, in a case where the reception state of the first LA of at least one of the N relay optical amplifier units is the LOS state, triggering the second LA of the present relay optical amplifier unit to control a pump laser according to the preset period of the sent encoded pulse signal.

In an optional embodiment, the method further comprises:
in a case where the PA of at least one of the two optical amplifier units detects an optical signal with a lasting time of a third duration, deactivating the APR protection state of the present optical amplifier unit; and/or,
in a case where the first LA of at least one of the N relay optical amplifier units detects an optical signal with a lasting time of the third duration, deactivating the APR protection state of the present relay optical amplifier unit.

In an optional embodiment, the switch chip is a chip with a remote fault notification function;
in a case where the switch chip of at least one of the two optical amplifier units detects the link interruption signal and/or the switch chip of at least one of the N relay optical amplifier units detects the link interruption signal, the link interruption signal is converted into an optical signal and then output the optical signal to the other optical amplifier unit or other relay optical amplifier units unit via an optical supervisory channel (OSC) module of the present optical amplifier unit, wherein the link interruption signal is an electrical signal.

In an optional embodiment, the encoded pulse signal is generated in the following mode: switching a pump laser according to the preset period so as to make the BA generate the encoded pulse signal.

In a second aspect, the embodiments of the present disclosure provide an APR protection device, comprising: two amplifier modules, a logic control module, an OSC module and a switch chip; the logic control module, the OSC module and the switch chip being located between the two amplifier modules; wherein the amplifier module comprises a pre-Amplifier PA and a booster amplifier BA, or a PA, a BA and a line amplifier LA;
the PA and the LA are used for detecting an optical signal and then marking a reception state based on the detected optical signal;
the switch chip is used for detecting whether a link interruption situation exists or not;
the OSC module is used for converting an electrical signal output by the switch chip into an optical signal and then outputting the optical signal;
the logic control module is used for performing logic processing based on a reception state and a link interruption situation of the PA and/or the LA, and triggering the amplifiers in the amplifier module to complete the APR protection method described in the first aspect.

In a third aspect, the embodiments of the present disclosure provide an APR protection device, comprising: a memory, a processor, and a computer program stored in the memory and executed by the processor;
wherein the processor is used for executing the computer program to implement the APR protection method described in the first aspect.

In a fourth aspect, the embodiments of the present disclosure provide a computer storage medium storing a computer program which may be executed by a processor to implement the APR protection method described in the first aspect.

The embodiments of the present disclosure disclose an APR protection method and device, and a computer storage medium. For two optical amplifier units at both ends of a transmission line, a preamplifier PA of each of the two optical amplifier units is connected to a booster amplifier BA of the other optical amplifier unit by means of an optical fiber, and the method comprises: in a case where a reception state of the PA of at least one of the two optical amplifier units is a loss of signal LOS state, and a switch chip of the present optical amplifier unit detects a link interruption signal, activating an APR protection state of the present optical amplifier unit, wherein the APR protection state is to turn off output of the BA of the present optical amplifier unit; and in a case where a switch chip of at least one of the two optical amplifier units detects a link conduction signal, deactivating the APR protection state of the present optical amplifier unit, so as to make a state of the BA of the present optical amplifier unit be restored to a state before the APR protection state is activated. In the embodiments of the present disclosure, whether the link is determined to be interrupted by means of the switch chip, and whether the APR protection state is determined to be activated based on the judgment information of the switch and the reception state of the amplifier module, and such compound activation condition may avoid mis-activation and linkage activation of the APR protection state caused by module fault in the optical amplifier unit.

BRIEF DESCRIPTION OF THE DRAWINGS

FIG. 1 is a schematic diagram showing an implementation flow of an APR protection method provided by an embodiment of the present disclosure.

FIG. 2 is a schematic diagram of an open optical transmission line system having only optical amplifier units at both ends.

DETAILED DESCRIPTION

Figure 3:
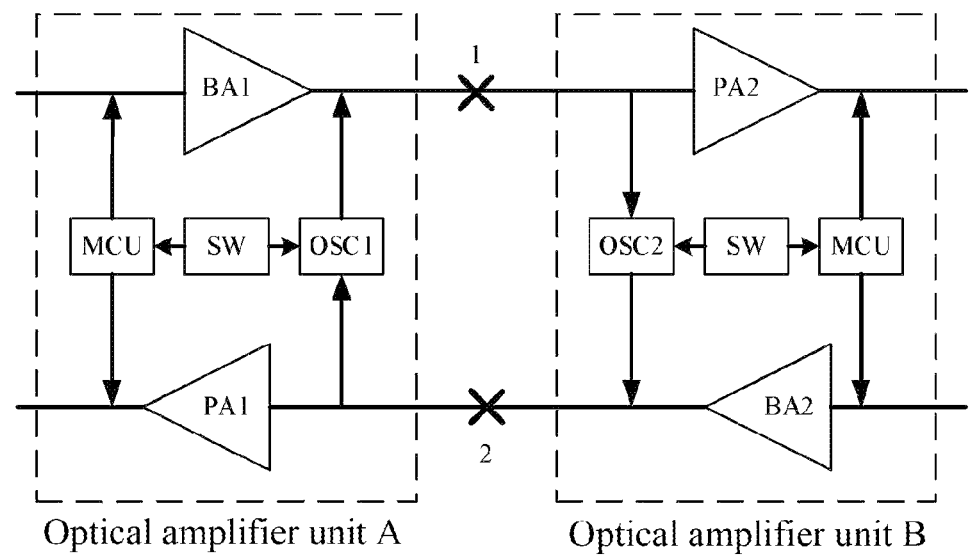
FIG. 3 is a schematic diagram of an open optical transmission line system having only optical amplifier units at both ends.

Exemplary embodiments as disclosed in the present disclosure will be described in more detail below with reference to the accompanying drawings. Although exemplary embodiments of the present disclosure are shown in the accompanying drawings, it should be understood that the present disclosure may be implemented in various forms and should not be limited by the specific embodiments set forth herein. Rather, these embodiments are provided to enable a more thorough understanding of the present disclosure, and may fully convey the scope of the present disclosure to those skilled in the art.

In the following description, numerous specific details are provided in order to provide a more thorough understanding of the present disclosure. However, it will be apparent for those skilled in the art that the present disclosure may be implemented without one or more of these details. In other examples, in order to avoid confusion with the present disclosure, some technical features well known in the art are not described; i.e. all features of an actual embodiment are not described herein, and well-known functions and structures are not described in detail.

In the accompanying drawings, dimensions of layers, of regions, and of elements, and their relative dimensions may be exaggerated for clarity. The same reference signs throughout refer to the same elements.

It should be understood that spatial relationship terms such as "under", "underneath", "lower", "below", "above", "on", etc. may be used herein for convenience of description to describe the relationship between one element or one feature to other elements or features shown in the figures. It should be understood that the spatial relative terms are intended to include different orientations of the device in use and operation in addition to the orientation shown in the figures. For example, if the devices in the figures are turned over, then the elements or features described as "underneath other elements" or "below" or "under" would be oriented as "above" the other elements or features. Thus, the exemplary terms "underneath" and "under" may include both an orientation of the above and the below. The device may be otherwise oriented (rotated 90 degrees or other orientations) and the spatial descriptors used herein are interpreted accordingly.

The terminology used herein is for the purpose of describing embodiments only and is not intended to be limiting of the present disclosure. As used herein, the singular forms "a," "an," and "the/said" are intended to include the plural forms as well, unless the context clearly indicates otherwise. It should also be understood that the terms "compose" and/or "comprise", when used in the present description, identify the presence of the described features, integers, steps, operations, elements and/or components, but do not exclude the presence or addition of one or more other features, integers, steps, operations, elements, components and/or groups. As used herein, the words "and/or" include any and all combinations of the associated listed items.

An embodiment of the present disclosure provides an APR protection method, and FIG. 1 is a schematic diagram of an implementation flow of an APR protection method provided by the embodiment of the present disclosure. For two optical amplifier units at both ends of a transmission line, a preamplifier PA of each of the two optical amplifier units is connected to a booster amplifier BA of the other optical amplifier unit by means of an optical fiber, and the method mainly comprises the following steps.

At step 101, in a case where a reception state of the PA of at least one of the two optical amplifier units is a loss of signal LOS state, and a switch chip of the present optical amplifier unit detects a link interruption signal, an APR protection state of the present optical amplifier unit is activated, wherein the APR protection state is to turn off output of the BA of the present optical amplifier unit.

In an embodiment of the present disclosure, a transmission line may include two optical amplifier units at both ends, and N relay optical amplifier units between the two optical amplifier units at both ends, where N is a positive integer. For two optical amplifier units at both ends of the transmission line, the PA of each optical amplifier unit in the two optical amplifier units is connected to the BA of the other optical amplifier unit by means of an optical fiber. For N relay optical amplifier units, each relay optical amplifier unit includes two line amplifiers LAs. It should be noted that the two optical amplifier units at both ends of the transmission line may also be referred to as terminal optical amplifier units.

In an embodiment of the present disclosure, for the two optical amplifier units at both ends of the transmission line, in a case where the reception state of the PA of at least one optical amplifier unit in the two optical amplifier units is a LOS state, and a switch chip of the present optical amplifier unit detects a link interruption signal, an APR protection state of the present optical amplifier unit is activated, wherein the APR protection state is to turn off output of the BA of the present optical amplifier unit. The switch chip is a chip with a remote fault notification function; in a case where the switch chip of at least one optical amplifier unit in the two optical amplifier units detects a link interruption signal, the link interruption signal is converted into an optical signal and then outputs the optical signal to the other optical amplifier unit via an OSC module of the optical amplifier unit, wherein the link interruption signal is an electrical signal. It should be noted that the switch chip in the embodiment of the present disclosure may determine whether the reason for the fault of the transmission line is that the pump laser is turned off or the link is interrupted (optical fiber breakage).

In an embodiment of the present disclosure, for the N relay optical amplifier units between the two optical amplifier units at both ends of the transmission line, in a case where a reception state of a first LA of at least one relay optical amplifier unit in the N relay optical amplifier units is the LOS state, and a switch chip of the present relay optical amplifier unit detects a link interruption signal, an APR protection state of the present relay optical amplifier unit is activated, wherein the APR protection state is to turn off output of a second LA of the relay optical amplifier unit. The switch chip is a chip with a remote fault notification function; in a case where the switch chip of at least one optical amplifier unit in the two optical amplifier units detects the link interruption signal, the link interruption signal is converted into an optical signal and then outputs the optical signal to the other optical amplifier unit or relay optical amplifier units other than the present relay optical amplifier unit via an optical monitoring channel OSC module of the present relay optical amplifier unit, wherein the link interruption signal is an electrical signal. It should be noted that the first LA and the second LA in the embodiments of the present disclosure are not specified LAs, and the first LA and the second LA are only used for distinguishing two LAs in one relay optical amplifier unit.

At step 102, in a case where a switch chip of at least one of the two optical amplifier units detects a link conduction signal, the APR protection state of the present optical amplifier unit is deactivated, so as to make a state of the BA of the present optical amplifier unit be restored to a state before the APR protection state is activated.

In an embodiment of the present disclosure, for the two optical amplifier units at both ends of the transmission line, in a case where a switch chip of at least one optical amplifier unit in the two optical amplifier units detects the link conduction signal, the APR protection state of the present optical amplifier unit is deactivated, so as to make the state of the BA of the present optical amplifier unit be restored to the state before the APR protection state is activated, wherein the link conduction may be an optical fiber conduction.

In an embodiments of the present disclosure, for the N relay optical amplifier units between the two optical amplifier units at both ends of the transmission line, in a case where a switch chip of at least one relay optical amplifier unit in the N relay optical amplifier units detects the link conduction signal, the APR protection state of the present relay optical amplifier unit is deactivated, so as to make a state of the second LA of the present relay optical amplifier unit be restored to a state before the APR protection state is activated.

It should be noted that, in practical applications, the OSC module in the optical amplifier unit or the relay optical amplifier unit is prone to be failed or be damaged, then in a case where the APR protection state is activated, even when the link is restored to the conduction state, the switch chip cannot receive the remote fault notification information sent by the other optical amplifier unit or other relay optical amplifier units due to the damage of the OSC module in the optical amplifier unit or the relay optical amplifier unit. As a result, the present optical amplifier unit or the present relay optical amplifier unit will always be in a state that the APR protection state is activated, and such situation is referred to as an APR deadlock. In order to solve the above-mentioned problem, the embodiments of the present disclosure further provide an APR protection method with an APR anti-deadlock mechanism.

The implementation process of the method is as follows: after activating the APR protection state of the present optical amplifier unit or the present relay optical amplifier unit, triggering the BA of the present optical amplifier unit to send an encoded pulse signal, of which a lasting time is a first duration, to the PA of the other optical amplifier unit according to a preset period; in a case where the PA of at least one of the two optical amplifier units detects the encoded pulse signal, marking the reception state of the PA of the optical amplifier unit as the non-LOS state; in a case where a light state of the PA of at least one of the two optical amplifier units lasts for a second duration, deactivating the APR protection state of the present optical amplifier unit; and/or, in a case where the first LA of at least one of the N relay optical amplifier units detects the encoded pulse signal, marking the reception state of the second LA of the present relay optical amplifier unit as the non-LOS state; in a case where the light state of the first LA of at least one of the N relay optical amplifier units lasts for the second duration, deactivating the APR protection state of the present relay optical amplifier unit; wherein the second duration is twice the first duration. In practical applications, the preset period may be 150 s, the lasting time 15 s, and the first duration 15 s. However, it should be noted that these times may be pre-written into the amplification unit by an operator, and may also be changed by an operator according to actual needs.

In an embodiment of the present disclosure, the encoded pulse signal is generated in the following mode: switching a pump laser according to the preset period so as to make the BA generate the encoded pulse signal.

In an embodiment of the present disclosure, when it is in the APR anti-deadlock mechanism, the BA will adjust the pump laser based on the reception state of the PA. Specifically, in a case where the reception state of the PA of at least one of the two optical amplifier units is the non-LOS state, the BA of the present optical amplifier unit is triggered to reduce its output power to be below preset power; and/or, in a case where the reception state of the first LA of at least one of the N relay optical amplifier units is the non-LOS state, the second LA of the present relay optical amplifier unit is triggered to reduce its output power to be below preset power; and in a case where the reception state of the PA of at least one of the two optical amplifier units is the LOS state, the BA of the present optical amplifier unit is triggered to control the pump laser according to the preset period of the sent encoded pulse signal; and/or, in a case where the reception state of the first LA of at least one of the N relay optical amplifier units is the LOS state, the second LA of the present relay optical amplifier unit is triggered to control the pump laser according to the preset period of the sent encoded pulse signal. In practical applications, the non-LOS state of the PA or LA can also be time limited; for example, in a case where the non-LOS state of the PA of at least one of the two optical amplifier units lasts for a preset time, the BA of the present optical amplifier unit is triggered to reduce the output power to be below the preset power; and/or, in a case where the non-LOS state of the first LA of at least one of the N relay optical amplifier units lasts for a preset time, the second LA of the present relay optical amplifier unit is triggered to reduce the output power to be below the preset power. Here, the preset time may be 1 s, or may be other times. It should be noted that the preset power may be eye protection power, and the eye protection power is a safe power that does not harm human eyes. The manner of reducing the output power of the BA and the LA is to adjust the output of the pump laser, and to make the output power thereof less than the preset power.

In an embodiment of the present disclosure, when it is in the APR anti-deadlock mechanism, if the OSC module is restored to be normal (in a case where the link is restored to the conduction state), the switch chip may receive the remote fault notification information sent by the other optical amplifier unit or other relay optical amplifier units, then, in a case where the PA of at least one of the two optical amplifier units detects an optical signal, of which a lasting time is a third duration, deactivating the APR protection state of the present optical amplifier unit may also be realized; and/or, in a case where the first LA of at least one of the N relay optical amplifier units detects an optical signal, of which the lasting time is the third duration, deactivating the APR protection state of the present relay optical amplifier unit may also be realized. In practical applications, the third duration may be 1 s. However, it should be noted that these times may be pre-written into the amplification unit by an operator, and may also be changed by an operator according to actual needs. In the embodiment of the present disclosure, even in the APR anti-deadlock mechanism, if the OSC module is restored to be normal, and the link is also restored to the conduction state, then the PA and the LA can continuously detect the optical signal, and in this case, the APR protection state may be immediately deactivated. In other words, the APR anti-deadlock mechanism may be immediately exited and the APR protection state may be immediately deactivated.

An APR protection method provided by the embodiments of the present disclosure will be clearly described below in detail with reference to FIG. 2 to FIG. 5. It should be noted that, in FIG. 2 to FIG. 5, SW indicates a switch chip, and MCU indicates a logic control unit.

FIG. 2 is a schematic diagram of an open optical transmission line system only having optical amplifier units at both ends. As shown in FIG. 2, there is no relay optical amplifier unit in the transmission line, and only one optical fiber is broken, the broken place being marked as 1.

(1) After the optical fiber is broken at the place 1, the optical amplifier unit B cannot receive the optical signal sent by the OSC1 module, and the switch chip SW1 detects a link interruption signal (OSC2 module LINKDOWN) and the reception state of PA2 is the LOS state, then the APR protection state of the optical amplifier unit B is activated, and the output of the BA2 is turned off. It should be noted that the link interruption signal (electrical signal) detected by the switch chip in the embodiments of the present disclosure needs to be converted into an optical signal through the OSC module and then sent out. Therefore, the switch chip and the OSC module can be collectively regarded as a link detection module, which is used for detecting a link state and sending a link state signal, wherein the link state signal includes a link interruption signal and a link conduction signal. In all of the following description, the optical signal (the link state signal detected by switch chip) converted by an OSC module is used as an example for explanation.

(2) Since the output of the BA2 is turned off, the reception state of the PA1 is the LOS state, and the OSC1 module LINKDOWN occurs, thus the APR protection state of the optical amplifier unit A is activated, and the output of the BA1 is turned off.

(3) If the optical fiber at place 1 is restored to conduction, and the OSC1 module and/or the OSC2 module are damaged at a certain moment before the optical fiber is restored to conduction, even if the line is unobstructed, but the switch chip SW still cannot receive the remote fault notification information sent by the optical amplifier unit at the opposite end, then the optical amplifier unit A and the optical amplifier unit B will always be in the state that the APR protection state is activated. An APR deadlock occurs in the system.

(4) The APR anti-deadlock mechanism is started 300 s after the APR protection state has been active for 300 s, and the BA1 sends an encoded pulse signal with a duration of 15 s and with a period of 150 s. It should be noted that an operator can change the starting time of the APR anti-deadlock mechanism, the period and the lasting time of the encoded pulse signal according to actual needs.

(5) After the PA2 receives the encoded pulse signal sent by the BA1, it marks the reception state thereof as a non-LOS state, and after the non-LOS state of the PA2 lasts for 1 s, a pump laser is triggered to be turned on, so that the BA2 sends an optical signal, but the output power of the optical signal is less than preset power. Since the BA2 sends an optical signal, the LOS state of the PA1 disappears, and the PA1 also marks the reception state thereof as the non-LOS state. After the non-LOS state of the PA1 lasts for 1 s, the pump laser is triggered to be turned on, so that the BA1 sends an optical signal, but the output power of the optical signal is less than the preset power.

(6) A series of controls of the above (5) will make the BA1 still be in a state that the pump laser is on after the BA1 sends the coded pulse signal, therefore, the LOS state of the PA2 will continuously disappear, and the LOS state of the PA1 will also continuously disappear.

(7) After the LOS state of the PA2 disappears for 30 s (i.e. the non-LOS state lasts for 30 s), the optical amplifier unit B deactivates the APR protection state, so that the output state of the pump laser of the BA2 is returned to the state before the APR protection state is activated.

(8) After the LOS state of the PA1 disappears for 30 s (i.e. the non-LOS state lasts for 30 s), the optical amplifier unit A deactivates the APR protection state, so that the output state of the pump laser of the BA1 is restored to the state before the APR protection state is activated.

FIG. 3 is a schematic diagram of an open optical transmission line system only having optical amplifier units at both ends. As shown in FIG. 3, in the transmission line, there is no relay optical amplifier unit and the two optical fiber are broken, where the broken places are marked as 1 and 2, respectively.

(1) After the optical fiber is broken at the broken place 1, the optical amplifier unit B cannot receive the optical signal sent by the OSC1 module, the OSC2 module LINKDOWN occurs, and the reception state of the PA2 is the LOS state, then the APR protection state of the optical amplifier unit B is activated, and the output of the BA2 is turned off.

(2) The optical fiber is broken at the broken place 2, then the reception state of the PA1 is the LOS state, the OSC1 module LINKDOWN occurs, thus the APR protection state of the optical amplifier unit A is activated, and the output of the BA1 is turned off.

(3) It is assumed that the optical fiber at the broken place 1 is firstly restored to conduction, and before the optical fiber at the broken place 1 is restored to conduction, the APR deadlock occurs. The anti-deadlock mechanism is started after the APR protection state has been active for 300 s, and the BA1 sends an encoded pulse signal with a duration of 15 s and with a period of 150 s.

(4) After received the encoded pulse signal sent by the BA1, the PA2 marks the reception state thereof as the non-LOS state, and after the non-LOS state of the PA2 lasts for 1 s, the pump laser is triggered to be turned on, so that the BA2 sends an optical signal, but the output power of the optical signal is less than preset power. Since the optical fiber at the broken place 2 is not restored to conduction, the PA1 is still in the LOS state.

(5) After the encoded pulse signal lasting for 15 s sent by the BA1, the PA2 marks the reception state thereof as a non-LOS state, and the pump laser is triggered to be turned off, thus the BA2 cannot send optical signals.

(6) It is assumed that the optical fiber at the place 2 is subsequently restored to conduction. Similar to the processes (1) to (5) as mentioned above, when the period of 150 s expires, the BA1 sends an encoded pulse signal with a duration of 15 s. After received the encoded pulse signal sent by the BA1, the PA2 marks the reception state thereof as the non-LOS state, and after the non-LOS state of the PA2 lasts for 1 s, the pump laser is triggered to be turned on, so that the BA2 sends an optical signal, but the output power of the optical signal is less than preset power.

(7) Since the BA2 sends an optical signal, the LOS state of the PA1 disappears, and the PA1 also marks the reception state thereof as the non-LOS state. After the non-LOS state of the PA1 lasts for 1 s, the pump laser is triggered to be turned on, so that the BA1 sends an optical signal, but the output power of the optical signal is less than preset power.

(8) A series of controls of the above (6) and (7) will make the BA1 still be in a state that the pump laser is on after the BA1 end up sending the coded pulse signal, therefore, the LOS state of the PA2 will continuously disappear, and the LOS state of the PA1 will also continuously disappear.

(9) After the LOS state of the PA2 disappears for 30 s (i.e. the non-LOS state lasts for 30 s), the optical amplifier unit B deactivates the APR protection state, so that the output state of the pump laser of the BA2 is restored to the state before the APR protection state is activated.

(10) After the LOS state of the PA1 disappears for 30 s (i.e. the non-LOS state lasts for 30 s), the optical amplifier unit A deactivates the APR protection state, so that the output state of the pump laser of the BA1 is returned to the state before the APR protection state is activated.

Figure 4:
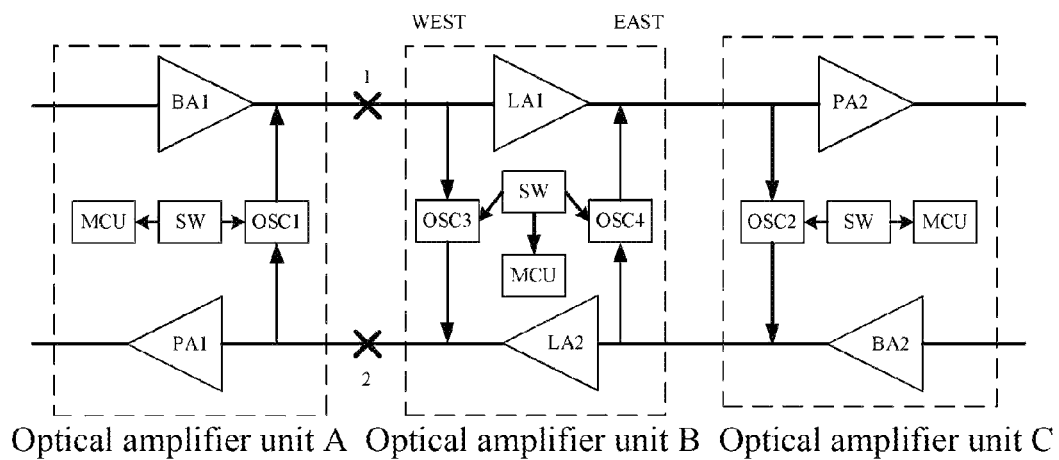
FIG. 4 is a schematic diagram of an open optical transmission line system, in which an intermediate optical amplifier unit is also provided between the optical amplifier units at both ends.

FIG. 4 is a schematic diagram of an open optical transmission line system which is also provided with an intermediate optical amplifier unit between the optical amplifier units at both ends. As shown in FIG. 4, the transmission line is provided with a relay optical amplifier unit and the two optical fibers in the same stage are broken, where the broken places are marked as 1 and 2, respectively.

(1) After the optical fiber is broken at the broken place 1, the optical amplifier unit B cannot receive an optical signal sent by the OSC1 module, the OSC3 module LINKDOWN occurs, and the reception state of the LA1 is the LOS state, then the APR protection state on the WEST side of the optical amplifier unit B is activated, and the output of the LA2 is turned off.

It should be noted that the reception state of the LA1 is the LOS state while the output of the LA1 is turned off (the working mode of the LA1 is to turn off the pump laser), which will cause the reception state of the PA2 of the optical amplifier unit C to be the LOS state; however, since the optical fiber lines between the optical amplifier units B and C are intact, the switch chip of the optical amplifier unit C cannot detect the link interruption signal, so that the OSC2 module LINKDOWN will not appear, therefore, the APR protection state of the EAST side of the optical amplifier unit B and the APR protection state of the optical amplifier unit C will not be activated, thereby avoiding the activation of the APR protection state of one stage of the optical amplifier unit from affecting the next-stage optical amplifier unit without the optical fiber broken and avoiding a linkage reaction.

(2) The optical fiber is broken at the broken place 2, then the reception state of the PA1 is the LOS state, the OSC1 module LINKDOWN occurs, the APR protection state of the optical amplifier unit A is activated, and the output of BA1 is turned off.

(3) It is assumed that the optical fiber at the broken place 1 is firstly restored to conduction, and before the optical fiber at the broken place 1 is restored to conduction, the APR deadlock occurs. The anti-deadlock mechanism is started after the APR protection state has been active for 300 s, and the BA1 sends an encoded pulse signal with a duration of 15 s and with a period of 150 s.

(4) After received the encoded pulse signal sent by the BA1, the LA1 marks the reception state thereof as the non-LOS state, and after the non-LOS state of the LA1 lasts for 1 s, the pump laser is triggered to be turned on, so that the LA2 sends an optical signal, but the output power of the optical signal is less than preset power. Since the conduction of the optical fiber is not recovered at the broken place 2, the PA1 is still in the LOS state.

(5) After the encoded pulse signal lasting for 15 s sent by the BA1, the LA1 marks the reception state thereof as the non-LOS state, and the pump laser is triggered to be turned off, thus the LA2 cannot send an optical signal.

(6) It is assumed that the optical fiber at the broken place 2 is subsequently restored to conduction. Similar to the processes (1) to (5) as mentioned above, when the period of 150 s expires, the BA1 sends an encoded pulse signal with a duration of 15 s. After received the encoded pulse signal sent by the BA1, the LA1 marks the reception state thereof as the non-LOS state, and after the non-LOS state of the LA1 lasts for 1 s, the pump laser is triggered to be turned on, so that the LA2 sends an optical signal, but the output power of the optical signal is less than preset power.

(7) Since the LA2 sends an optical signal, the LOS state of PA1 disappears, and the PA1 also marks the reception state thereof as the non-LOS state. After the non-LOS state of the PA1 lasts for 1 s, the pump laser is triggered to be turned on, so that the BA1 sends an optical signal, but the output power of the optical signal is less than preset power.

(8) A series of controls of the above (6) and (7) will make the BA1 be in a state that the pump laser still is on after the BA1 ends up sending the coded pulse signal, therefore, the LOS state of the LA1 will continuously disappear, and the LOS state of the PA1 will also continuously disappear.

(9) After the LOS state of the LA1 disappears for 30 s (i.e. the non-LOS state lasts for 30 s), the optical amplifier unit BWEST deactivates the APR protection state, so that the output state of the pump laser of the LA2 is returned to the state before the APR protection state is activated.

(10) After the LOS state of the PA1 disappears for 30 s (i.e. the non-LOS state lasts for 30 s), the optical amplifier unit A deactivates the APR protection state, so that the output state of the pump laser of the BA1 is returned to the state before the APR protection state is activated.

Figure 5:
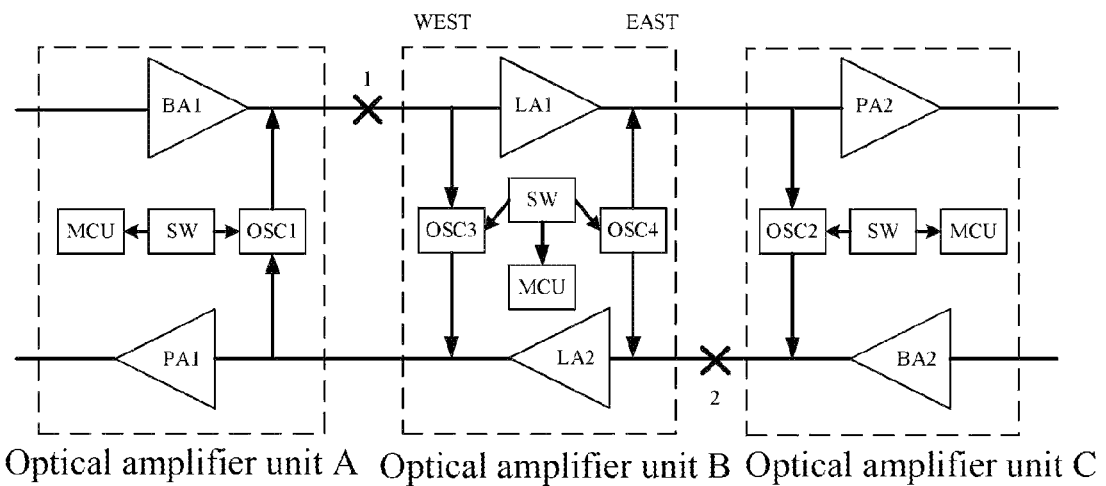
FIG. 5 is a schematic diagram of an open optical transmission line system, in which an intermediate optical amplifier unit is also provided between the optical amplifier units at both ends.

FIG. 5 is a schematic diagram of an open optical transmission line system which is also provided with an intermediate optical amplifier unit between the optical amplifier units at both ends. As shown in FIG. 5, the transmission line is provided with a relay optical amplifier unit and one optical fiber in each of the two stages is broken, where the broken places are marked as 1 and 2, respectively.

(1) After the optical fiber is broken at the broken place 1, the optical amplifier unit B cannot receive an optical signal sent by the OSC1 module, the OSC3 module LINKDOWN occurs, and the reception state of the LA1 is the LOS state, then the APR protection state on the WEST side of the optical amplifier unit B is activated, and the output of the LA2 is turned off.

(2) After the optical fiber is broken at the broken place 2, the reception state of the LA2 is the LOS state, and the OSC4 module LINKDOWN occurs, then the APR protection state on the EAST side of the optical amplifier unit B is activated, and the output of the LA2 is turned off. The turn-off of the LA1 causes the reception state of the PA2 to be the LOS state, and the OSC2 module LINKDOWN occurs, then the APR protection state of the optical amplifier unit C is activated, and the output of BA2 is turned off.

(3) It is assumed that the optical fiber at the broken place 1 is firstly restored to conduction, and before the optical fiber at the broken place 1 is restored to conduction, the APR deadlock occurs. The anti-deadlock mechanism is started after the APR protection state has been active for 300 s, and the BA1 sends an encoded pulse signal with a duration of 15 s and with a period of 150 s.

(4) After the LA1 receives the encoded pulse signal sent by the BA1, it marks the reception state thereof as the non-LOS state, and after the non-LOS state of the LA1 lasts for 1 s, the pump laser is triggered to be turned on, so that the LA2 sends an optical signal, but the output power of the optical signal is less than preset power.

(5) The continuous light-emitting of the LA2 will make the LOS state of the PA2 disappear, and the PA1 also marks the reception state thereof as the non-LOS state.

After the non-LOS state of the PA1 lasts for 1 s, the pump laser is triggered to be turned on, so that the BA1 sends an optical signal, but the output power of the optical signal is less than preset power.

(6) A series of controls of the above (5) will make the BA1 be in a state that the pump laser still is on after the BA1 ends up sending the coded pulse signal, therefore, the LOS state of the PA2 will continuously disappear, and the LOS state of the PA1 will also continuously disappear.

(7) After the LOS state of the LA1 disappears for 30 s (i.e. the non-LOS state lasts for 30 s), the WEST side of the optical amplifier unit B deactivates the APR protection state, so that the output state of the pump laser of the LA2 is returned to the state before the APR protection state is activated.

(8) After the LOS state of the PA1 disappears for 30 s (i.e. the non-LOS state lasts for 30 s), the optical amplifier unit A deactivates the APR protection state, so that the output state of the pump laser of the BA1 is returned to the state before the APR protection state is activated.

(9) It is assumed that the optical fiber at the broken place 2 is subsequently restored to conduction. And before the optical fiber at the broken place 2 is restored to conduction, the APR deadlock occurs. The anti-deadlock mechanism is started after the APR protection state has been active for 300 s, and the LA1 sends an encoded pulse signal with a duration of 15 s and with a period of 150 s.

(10) After the PA2 receives the encoded pulse signal sent by the LA1, it marks the reception state thereof as a non-LOS state, and after the non-LOS state of the PA2 lasts for 1 s, the pump laser is triggered to be turned on, so that the BA2 sends an optical signal, but the output power of the optical signal is less than preset power.

(11) The continuous light-emitting of the BA2 will make the LOS state of the LA2 disappear, and the LA2 also marks the reception state thereof as the non-LOS state. After the non-LOS state of the LA2 lasts for 1 s, the pump laser is triggered to be turned on, so that the LA1 sends an optical signal, but the output power of the optical signal is less than preset power.

(12) A series of controls of the above (11) will make the LA1 still be in a state that the pump laser is on after the LA1 ends up sending the coded pulse signal, therefore, the LOS state of the PA2 will continuously disappear, and the LOS state of the LA2 will also continuously disappear.

(13) After the LOS state of the LA2 disappears for 30 s, the EAST side of the optical amplifier unit B deactivates the APR protection state, so that the output state of the pump laser of the LA1 is returned to the state before the APR protection state is activated.

(14) After the LOS state of the PA2 disappears for 30 s, the optical amplifier unit C deactivates the APR protection state, so that the output state of the pump laser of the BA2 is returned to the state before the APR protection state is activated.

It should be noted that the broken place 1 and the broken place 2 are located at different stages, and since the two stages do not interfere with each other, there is no necessary sequence to firstly restore the broken place 1 or firstly restore the broken place 2.

Based on the same technical concept as the aforementioned APR protection method, the embodiments of the present disclosure provides an APR protection device, and the APR protection device comprises:

two amplifier modules, a logic control module, an OSC module and a switch chip, wherein the logic control module, the OSC module and the switch chip are located between the two amplifier modules; wherein the amplifier module comprises the following amplifiers: a pre-Amplifier PA and a booster amplifier BA, or a PA, a BA and a line amplifier LA;

wherein the PA and the LA are used for detecting an optical signal and then marking a reception state based on a situation of the detected optical signal;

the switch chip is used for detecting whether a link interruption situation exists or not;

the OSC module is used for converting an electrical signal output by the switch chip into an optical signal and then outputting the optical signal; and the logic control module is used for performing logic processing based on the reception state and the link interruption situation of the PA and/or the LA, and triggering the amplifier(s) in the amplifier module to complete the aforementioned APR protection method.

Each component in the embodiments of the present disclosure may be integrated in one processing unit, or each unit may physically exist separately, or two or more than two units may be integrated into one unit. The above-mentioned integrated units may be implemented in the form of hardware or may be implemented in the form of a software function module.

When the integrated unit is implemented in the form of software function module and is not sold or used as an independent product, it may be stored in a computer-readable storage medium, and based on such an understanding, the technical solution of the embodiments of the present disclosure, or the portion that has contributed to the prior art, or all or a portion of the technical solution, may essentially be embodied in the form of software products. The computer software product is stored in a storage medium, including instructions to enable a computer device (which may be a personal computer, a server, or a network device, etc.) or a processor to perform all or a portion of the steps of the method described in the embodiments of the present disclosure. The aforementioned storage medium includes various media that can store program codes, such as a USB flash disk, a mobile hard disk, a read-only memory (ROM), a random access memory (RAM), a magnetic disk, or an optical disk, and the like.

Therefore, the embodiments of the present disclosure provides a storage medium, and the storage medium stores a computer program for implementing the steps described in the above-mentioned embodiment, when executed by at least one processor.

Figure 6:
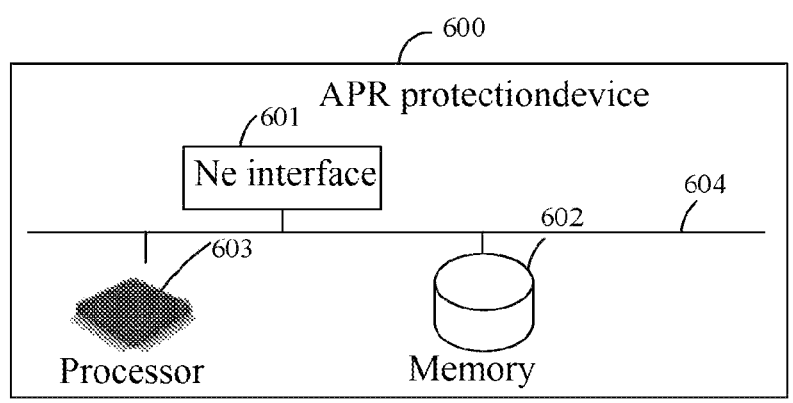
FIG. 6 is a schematic diagram of a specific hardware structure of an APR protection device according to an embodiment of the present disclosure.

Referring to FIG. 6, what is shown is a specific hardware structure of an APR protection device 600 provided by an embodiment of the present disclosure, comprising: a network interface 601, a memory 602 and a processor 603; each component being coupled together through a bus system 604. It can be understood that the bus system 604 is used for implementing the connection communication between these components. The bus system 604 includes a power bus, a control bus, and a state signal bus in addition to a data bus. However, for clarity of description, various buses are labeled as the bus system 604 in FIG. 6.

The network interface 601 is used for receiving and sending a signal in a process of sending and receiving information with other external network elements.

The memory 602 is used for storing a computer program capable of running on the processor 603.

The processor 603 is used for, when running the computer program, executing:

in a case where a reception state of the PA of at least one of the two optical amplifier units is a loss of signal LOS state, and a switch chip of the present optical amplifier unit detects a link interruption signal, activating an APR protection state of the present optical amplifier unit, wherein the APR protection state is to turn off BA output of the present optical amplifier unit;

in a case where a switch chip of at least one optical amplifier unit in the two optical amplifier units detects a link conduction signal, deactivating the APR protection state of the present optical amplifier unit, so as to make a state of the BA of the present optical amplifier unit be restored to a state before the APR protection state is activated.

The processor 603 is further used for, when running the computer program, executing:

in a case where N relay optical amplifier units are further comprised between the two optical amplifier units, where N is a positive integer, a reception state of a first optical line amplifier LA of at least one of which is a LOS state, and a switch chip of the present relay optical amplifier unit detects the link interruption signal, activating an APR protection state of a present relay optical amplifier unit, wherein the APR protection state is to turn off a second LA output of the relay optical amplifier unit;

in a case where a switch chip of at least one relay optical amplifier unit in the N relay optical amplifier units detects the link conduction signal, deactivating the APR protection state of the present relay optical amplifier unit, so as to make a state of the second LA of the present relay optical amplifier unit is restored to a state before the APR protection state be activated.

The processor 603 is further used for, when running the computer program, executing:

after the activation of the APR protection state of the present optical amplifier unit, the method further comprising:

triggering the BA of the present optical amplifier unit to send an encoded pulse signal, of which the lasting time is a first duration, to the PA of the other optical amplifier unit according to a preset period; in a case where the PA of at least one optical amplifier unit in the two optical amplifier units detects the encoded pulse signal, marking the reception state of the PA of the optical amplifier unit as a non-LOS state; and in a case where a light state of the PA of at least one optical amplifier unit in the two optical amplifier units lasts for a second duration, deactivating an APR protection state of the present optical amplifier unit; and/or, in a case where the first LA of at least one relay optical amplifier unit in the N relay optical amplifier units detects the encoded pulse signal, marking the reception state of the second LA of the present relay optical amplifier unit as the non-LOS state; and in a case where the light state of the first LA of at least one relay optical amplifier unit in the N relay optical amplifier units lasts for the second duration, deactivating the APR protection state of the present relay optical amplifier unit;

wherein the second duration is twice the first duration.

The processor 603 is further used for, when running the computer program, executing:

in a case where the reception state of the PA of at least one optical amplifier unit in the two optical amplifier units is the LOS state, triggering the BA of the present optical amplifier unit to reduce the output power to be below preset power; and/or, in a case where the reception state of the first LA of at least one relay optical amplifier unit in the N relay optical amplifier units is a non-LOS state, triggering the second LA of the present relay optical amplifier unit to reduce the output power to be below preset power; and in a case where the reception state of the PA of at least one optical amplifier unit in the two optical amplifier units is the LOS state, triggering the BA of the present optical amplifier unit to control a pump laser according to the preset period of the sent encoded pulse signal; and/or, in a case where the reception state of the first LA of at least one relay optical amplifier unit in the N relay optical amplifier units is the LOS state, triggering the second LA of the present relay optical amplifier unit to control a pump laser according to the preset period of the sent encoded pulse signal.

The processor 603 is further used for, when running the computer program, executing:

in a case where the PA of at least one optical amplifier unit in the two optical amplifier units detects an optical signal, of which the lasting time is a third duration, deactivating the APR protection state of the present optical amplifier unit; and/or, in a case where the first LA of at least one relay optical amplifier unit in the N relay optical amplifier units detects an optical signal, of which the lasting time is the third duration, deactivating the APR protection state of the present relay optical amplifier unit.

The processor 603 is further used for, when running the computer program, executing:

The switch chip being a chip with a remote fault notification function;

in a case where the switch chip of at least one optical amplifier unit in the two optical amplifier units detects the link interruption signal and/or the switch chip of at least one optical amplifier unit in the two optical amplifier units detects the link interruption signal, the link interruption signal is converted into an optical signal and then output to the other optical amplifier unit or other relay optical amplifier units via an optical monitoring channel OSC module of the present optical amplifier unit, wherein the link interruption signal is an electrical signal.

The processor 603 is further used for, when running the computer program, executing:

the encoded pulse signal being generated in the following mode: switching a pump laser according to a preset period to make the BA generate the encoded pulse signal.

It can be understood that the memory 602 in the embodiments of the present disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which acts as an external cache. By way of example and not limitation, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic random access memory (Sync Link DRAM, SLDRAM), and direct memory bus random access memory (Direct Rambus RAM, DRRAM). The memory 602 of the method described herein is intended to include, but is not limited to, these and any other suitable types of memory.

And the processor 603 may be an integrated circuit chip, which has a signal processing capability. In the implementation process, each step of the above-mentioned method may be completed through an integrated logic circuit of hardware in the processor 603 or an instruction in the form of software. The above-mentioned processor 603 may be a general-purpose processor, a digital signal processor (DSP), an application specific integrated circuit (ASIC), a field programmable gate array (FPGA) or other programmable logic device, a discrete gate or transistor logic device, and a discrete hardware component. The methods, steps, and logic block diagrams disclosed in the embodiments of the present disclosure may be implemented or executed. The general-purpose processor may be a microprocessor or the processor may be any conventional processor or the like. The steps of the methods disclosed in conjunction with the embodiments of the present disclosure may be directly embodied as that the completion of this step is executed by a hardware decoding processor, or by a combination of hardware and software modules in the decoding processor. The software module may be located in a mature storage medium of the art, such as a random access memory, a flash memory, a read-only memory, a programmable read-only memory, an electrically erasable programmable memory, a register, and the like. The storage medium is located in the memory, and the processor reads the information in the memory, and the steps of the above-mentioned method are completed in combination with the hardware thereof.

It can be understood that, these embodiments described herein may be implemented by hardware, software, firmware, middleware, microcode, or a combination thereof. For a hardware implementation, a processing unit may be implemented in one or more application specific integrated circuits (ASIC), digital signal processer (DSP), digital signal processing devices (DSP Device, DSPD), programmable logic devices (PLD), field programmable gate arrays (FPGA), general-purpose processors, controllers, microcontrollers, microprocessors, other electronic units for executing the functions described herein, or combinations thereof.

For a software implementation, the technology described herein may be implemented through modules (e.g. a process, a function, etc.) that execute the functions described herein. The software code may be stored in the memory and executed by the processor. The memory can be implemented in the processor or external to the processor.

It should be understood that "one embodiment" or "an embodiment" mentioned throughout the description means that a particular feature, structure, or characteristic related to the present embodiment is included in at least one embodiment of the present disclosure. Thus, "in one embodiment" or "in an embodiment" in various places throughout the description does not necessarily refer to the same embodiment. Furthermore, these particular features, structures, or characteristics may be combined in any suitable manner in one or more embodiments. It should be understood that, in various embodiments of the present disclosure, the size of the serial numbers of the above-mentioned processes does not mean the sequence of execution, and the execution sequence of each process should be determined by the function and the internal logic thereof, and should not constitute any limitation on the implementation process of the embodiments of the present disclosure. The above-mentioned serial numbers of the embodiments of the present disclosure are only for description, and do not represent the advantages or disadvantages of the embodiments.

It should be noted that, herein, the terms "comprising", "including" or any other variation thereof herein are intended to encompass a non-exclusive inclusion, such that a process, a method, an article, or a device comprising a series of elements not only includes those elements, but also includes other elements not expressly listed, or further includes an element inherent to such a process, method, article, or apparatus. Without further limitations, an element defined by the sentence "comprising one . . . " or "including one . . . " does not exclude the existence of other identical elements in a process, a method, an article or a device that includes the element.

In the several embodiments provided in the present disclosure, it should be understood that the disclosed method and device may be implemented in other manners. The device embodiments described above are merely schematic, for example, the division of the units is merely a logical function division, and there may be another division mode in actual implementation, e.g. multiple units or components may be combined, or may be integrated into another system, or some features may be ignored or not executed. In addition, the coupling, or direct coupling, or communication connection between the various components shown or discussed may be through some interfaces, and the indirect coupling or communication connection of devices or units may be electrical, mechanical or other forms.

The unit described above as a separate component may or may not be physically separated, and the component displayed as a unit may or may not be a physical unit, that is, it may be located in one place or distributed to multiple network units; and some or all of the units may be selected according to actual needs to realize the purpose of the solutions of the present embodiments.

In addition, each functional unit in each embodiment of the present disclosure may all be integrated into one processing module, or each unit may be separately used as a unit, or two or more units may be integrated into one unit; the above-mentioned integrated unit may be implemented in a form of hardware, or may be implemented in a form of hardware plus software functional units. Those ordinary skilled in the art may understand that all or a portion of the steps of implementing the above-mentioned method embodiments may be completed by means of hardware related to a program instruction, and the aforementioned program may be stored in a computer-readable storage medium, and when the program is executed, the steps of the above-mentioned method embodiments are executed; and the aforementioned storage medium includes various media that may store program codes, such as a removable storage device, a read-only memory (ROM), a random access memory (RAM), a magnetic disk, or an optical disk, and the like.

The methods disclosed in the several method embodiments provided in the present disclosure can be arbitrarily combined under the condition of no conflict to obtain new method embodiments.

The features disclosed in the several product embodiments provided in the present disclosure may be arbitrarily combined without conflict to obtain a new product embodiment.

The features disclosed in several method embodiments or device embodiments provided in the present disclosure may be combined arbitrarily without conflict to obtain a new method embodiments or device embodiments.

The above description is only specific embodiments of the present disclosure, however, the protection scope of the present disclosure is not limited to it, and any person skilled in the art can easily think of changes or substitutions within the technical scope as disclosed by the present disclosure, and which should be included within the protection scope of the present disclosure. Therefore, the protection scope of the present disclosure should be subject to the protection scope of the present disclosure.

What is claimed is:

1. An automatic optical power reduction APR protection method, for two optical amplifier units at both ends of a transmission line, a preamplifier PA of each of the two optical amplifier units being connected to a boost amplifier BA of the other optical amplifier unit by means of an optical fiber, the method comprising:
   in a case where a reception state of the PA of at least one of the two optical amplifier units is a loss of signal LOS state, and a switch chip of the present optical amplifier unit detects a link interruption signal, activating an APR protection state of the present optical amplifier unit, wherein the APR protection state is to turn off output of the BA of the present optical amplifier unit;
   in a case where the switch chip of at least one of the two optical amplifier units detects a link conduction signal, deactivating the APR protection state of the present optical amplifier unit, so as to make a state of the BA of the present optical amplifier unit be restored to a state before the APR protection state is activated,
   wherein N relay optical amplifier units are further provided between the two optical amplifier units, where N is a positive integer;
   in a case where a reception state of a first optical line amplifier LA of at least one of the N relay optical amplifier units is the LOS state, and a switch chip of the present relay optical amplifier unit detects the link interruption signal, activating an APR protection state of the present relay optical amplifier unit, wherein the APR protection state is to turn off a second LA output of the present relay optical amplifier unit;
   in a case where the switch chip of at least one of the N relay optical amplifier units detects the link conduction signal, deactivating the APR protection state of the present relay optical amplifier unit, so as to make a state of the second LA of the present relay optical amplifier unit be restored to a state before the APR protection state is activated.

2. The APR protection method of claim 1, wherein after the activation of the APR protection state of the present optical amplifier unit, the method further comprises:
   triggering the BA of the present optical amplifier unit to send an encoded pulse signal with a lasting time of a first duration to the PA of the other optical amplifier unit according to a preset period; in a case where the PA of at least one of the two optical amplifier units detects the encoded pulse signal, marking the reception state of the PA of the present optical amplifier unit as a non-LOS state; in a case where a light state of the PA of at least one of the two optical amplifier units lasts for a second duration, deactivating the APR protection state of the present optical amplifier unit; and/or, in a case where the first LA of at least one of the N relay optical amplifier units detects the encoded pulse signal, marking the reception state of the second LA of the present relay optical amplifier unit as the non-LOS state; in a case where a light state of the first LA of at least one of the N relay optical amplifier units lasts for the second duration, deactivating the APR protection state of the present relay optical amplifier unit;
   wherein the second duration is twice the first duration.

3. The APR protection method of claim 2, wherein the method further comprises:
   in a case where the reception state of the PA of at least one of the two optical amplifier units is the non-LOS state, triggering the BA of the present optical amplifier unit to reduce output power to be below preset power; and/or, in a case where the reception state of the first LA of at least one of the N relay optical amplifier units is the non-LOS state, triggering the second LA of the present relay optical amplifier unit to reduce output power to be below preset power; and
   in a case where the reception state of the PA of at least one of the two optical amplifier units is the LOS state, triggering the BA of the present optical amplifier unit to control a pump laser according to the preset period of the sent encoded pulse signal; and/or, in a case where the reception state of the first LA of at least one of the N relay optical amplifier units is the LOS state, triggering the second LA of the present relay optical amplifier unit to control the pump laser according to the preset period of the sent encoded pulse signal.

4. The APR protection method of claim 2, wherein the encoded pulse signal is generated in the following mode: switching the pump laser according to the preset period so as to make the BA generate the encoded pulse signal.

5. The APR protection method of claim 1, wherein the method further comprises:
   in a case where the PA of at least one of the two optical amplifier units detects an optical signal with a lasting time of a third duration, deactivating the APR protection state of the present optical amplifier unit; and/or,
   in a case where the first LA of at least one of the two optical amplifier units detects an optical signal with a lasting time of the third duration, deactivating the APR protection state of the present relay optical amplifier unit.

6. The APR protection method of claim 1, wherein
   the switch chip is a chip with a remote fault notification function;
   in a case where the switch chip of at least one of the two optical amplifier units detects the link interruption signal and/or the switch chip of at least one of the N relay optical amplifier units detects the link interruption signal, the link interruption signal is converted into an optical signal and then the optical signal is output to the other optical amplifier units or other relay optical amplifier units via an optical supervisory channel OSC module of the present optical amplifier unit, wherein the link interruption signal is an electrical signal.

7. An automatic optical power reduction APR protection device, comprising: two amplifier modules, a logic control module, an optical supervisory channel OSC module and a switch chip, the logic control module, the OSC module and the switch chip being located between the two amplifier modules; wherein the amplifier module comprises the following amplifiers: a preamplifier PA and a boost amplifier BA; or a PA, a BA and a line amplifier LA;
   the PA and the LA are used for detecting an optical signal and then marking a reception state based on a situation of the detected optical signal;

the switch chip is used for detecting whether a link interruption situation exists or not;

the OSC module is used for converting an electrical signal output by the switch chip into an optical signal and then outputting the optical signal;

the logic control module is used for performing logic processing based on a reception state and a link interruption situation of the PA and/or LA, and triggering the amplifier(s) in the amplifier module to complete an automatic optical power reduction APR protection method, for two optical amplifier units at both ends of a transmission line, a preamplifier PA of each of the two optical amplifier units being connected to a boost amplifier BA of the other optical amplifier unit by means of an optical fiber, the method comprising:

in a case where a reception state of the PA of at least one of the two optical amplifier units is a loss of signal LOS state, and a switch chip of the present optical amplifier unit detects a link interruption signal, activating an APR protection state of the present optical amplifier unit, wherein the APR protection state is to turn off output of the BA of the present optical amplifier unit;

in a case where the switch chip of at least one of the two optical amplifier units detects a link conduction signal, deactivating the APR protection state of the present optical amplifier unit, so as to make a state of the BA of the present optical amplifier unit be restored to a state before the APR protection state is activated.

8. The APR protection device according to claim 7, wherein N relay optical amplifier units are further provided between the two optical amplifier units, where N is a positive integer;

in a case where a reception state of a first optical line amplifier LA of at least one of the N relay optical amplifier units is the LOS state, and a switch chip of the present relay optical amplifier unit detects the link interruption signal, activating an APR protection state of the present relay optical amplifier unit, wherein the APR protection state is to turn off a second LA output of the present relay optical amplifier unit;

in a case where the switch chip of at least one of the N relay optical amplifier units detects the link conduction signal, deactivating the APR protection state of the present relay optical amplifier unit, so as to make a state of the second LA of the present relay optical amplifier unit be restored to a state before the APR protection state is activated.

9. The APR protection device according to claim 8, wherein after the activation of the APR protection state of the present optical amplifier unit, the method further comprises:

triggering the BA of the present optical amplifier unit to send an encoded pulse signal with a lasting time of a first duration to the PA of the other optical amplifier unit according to a preset period; in a case where the PA of at least one of the two optical amplifier units detects the encoded pulse signal, marking the reception state of the PA of the present optical amplifier unit as a non-LOS state; in a case where a light state of the PA of at least one of the two optical amplifier units lasts for a second duration, deactivating the APR protection state of the present optical amplifier unit; and/or, in a case where the first LA of at least one of the N relay optical amplifier units detects the encoded pulse signal, marking the reception state of the second LA of the present relay optical amplifier unit as the non-LOS state; in a case where a light state of the first LA of at least one of the N relay optical amplifier units lasts for the second duration, deactivating the APR protection state of the present relay optical amplifier unit;

wherein the second duration is twice the first duration.

10. The APR protection device according to claim 9, wherein the method further comprises:

in a case where the reception state of the PA of at least one of the two optical amplifier units is the non-LOS state, triggering the BA of the present optical amplifier unit to reduce output power to be below preset power; and/or, in a case where the reception state of the first LA of at least one of the N relay optical amplifier units is the non-LOS state, triggering the second LA of the present relay optical amplifier unit to reduce output power to be below preset power; and in a case where the reception state of the PA of at least one of the two optical amplifier units is the LOS state, triggering the BA of the present optical amplifier unit to control a pump laser according to the preset period of the sent encoded pulse signal; and/or, in a case where the reception state of the first LA of at least one of the N relay optical amplifier units is the LOS state, triggering the second LA of the present relay optical amplifier unit to control the pump laser according to the preset period of the sent encoded pulse signal.

11. The APR protection device according to claim 9, wherein the encoded pulse signal is generated in the following mode: switching the pump laser according to the preset period so as to make the BA generate the encoded pulse signal.

12. The APR protection device according to claim 8, wherein the method further comprises:

in a case where the PA of at least one of the two optical amplifier units detects an optical signal with a lasting time of a third duration, deactivating the APR protection state of the present optical amplifier unit; and/or, in a case where the first LA of at least one of the two optical amplifier units detects an optical signal with a lasting time of the third duration, deactivating the APR protection state of the present relay optical amplifier unit.

13. The APR protection device according to claim 7, wherein the switch chip is a chip with a remote fault notification function;

in a case where the switch chip of at least one of the two optical amplifier units detects the link interruption signal and/or the switch chip of at least one of the N relay optical amplifier units detects the link interruption signal, the link interruption signal is converted into an optical signal and then the optical signal is output to the other optical amplifier units or other relay optical amplifier units via an optical supervisory channel OSC module of the present optical amplifier unit, wherein the link interruption signal is an electrical signal.

14. An APR protection device, comprising: a memory, a processor and a computer program which is stored in the memory and executed by the processor;

wherein the processor is used for implementing an automatic optical power reduction APR protection method, for two optical amplifier units at both ends of a transmission line, a preamplifier PA of each of the two optical amplifier units being connected to a boost amplifier BA of the other optical amplifier unit by means of an optical fiber, the method comprising:

in a case where a reception state of the PA of at least one of the two optical amplifier units is a loss of signal LOS state, and a switch chip of the present optical amplifier unit detects a link interruption signal, activating an APR protection state of the present optical amplifier unit, wherein the APR protection state is to turn off output of the BA of the present optical amplifier unit;

in a case where the switch chip of at least one of the two optical amplifier units detects a link conduction signal, deactivating the APR protection state of the present optical amplifier unit, so as to make a state of the BA of the present optical amplifier unit be restored to a state before the APR protection state is activated, wherein N relay optical amplifier units are further provided between the two optical amplifier units, where N is a positive integer;

in a case where a reception state of a first optical line amplifier LA of at least one of the N relay optical amplifier units is the LOS state, and a switch chip of the present relay optical amplifier unit detects the link interruption signal, activating an APR protection state of the present relay optical amplifier unit, wherein the APR protection state is to turn off a second LA output of the present relay optical amplifier unit;

in a case where the switch chip of at least one of the N relay optical amplifier units detects the link conduction signal, deactivating the APR protection state of the present relay optical amplifier unit, so as to make a state of the second LA of the present relay optical amplifier unit be restored to a state before the APR protection state is activated.

15. The APR protection device according to claim 14, wherein after the activation of the APR protection state of the present optical amplifier unit, the method further comprises:

triggering the BA of the present optical amplifier unit to send an encoded pulse signal with a lasting time of a first duration to the PA of the other optical amplifier unit according to a preset period; in a case where the PA of at least one of the two optical amplifier units detects the encoded pulse signal, marking the reception state of the PA of the present optical amplifier unit as a non-LOS state; in a case where a light state of the PA of at least one of the two optical amplifier units lasts for a second duration, deactivating the APR protection state of the present optical amplifier unit; and/or, in a case where the first LA of at least one of the N relay optical amplifier units detects the encoded pulse signal, marking the reception state of the second LA of the present relay optical amplifier unit as the non-LOS state; in a case where a light state of the first LA of at least one of the N relay optical amplifier units lasts for the second duration, deactivating the APR protection state of the present relay optical amplifier unit;

wherein the second duration is twice the first duration.

16. The APR protection device according to claim 15, wherein the encoded pulse signal is generated in the following mode: switching the pump laser according to the preset period so as to make the BA generate the encoded pulse signal;

or the method further comprises:
in a case where the reception state of the PA of at least one of the two optical amplifier units is the non-LOS state, triggering the BA of the present optical amplifier unit to reduce output power to be below preset power; and/or, in a case where the reception state of the first LA of at least one of the N relay optical amplifier units is the non-LOS state, triggering the second LA of the present relay optical amplifier unit to reduce output power to be below preset power; and in a case where the reception state of the PA of at least one of the two optical amplifier units is the LOS state, triggering the BA of the present optical amplifier unit to control a pump laser according to the preset period of the sent encoded pulse signal; and/or, in a case where the reception state of the first LA of at least one of the N relay optical amplifier units is the LOS state, triggering the second LA of the present relay optical amplifier unit to control the pump laser according to the preset period of the sent encoded pulse signal.

17. The APR protection device according to claim 14, wherein the method further comprises:

in a case where the PA of at least one of the two optical amplifier units detects an optical signal with a lasting time of a third duration, deactivating the APR protection state of the present optical amplifier unit; and/or, in a case where the first LA of at least one of the two optical amplifier units detects an optical signal with a lasting time of the third duration, deactivating the APR protection state of the present relay optical amplifier unit.

18. The APR protection device according to claim 14, wherein the switch chip is a chip with a remote fault notification function;

in a case where the switch chip of at least one of the two optical amplifier units detects the link interruption signal and/or the switch chip of at least one of the N relay optical amplifier units detects the link interruption signal, the link interruption signal is converted into an optical signal and then the optical signal is output to the other optical amplifier units or other relay optical amplifier units via an optical supervisory channel OSC module of the present optical amplifier unit, wherein the link interruption signal is an electrical signal.

* * * * *